United States Patent [19]

Steenberg

[11] 4,356,888

[45] Nov. 2, 1982

[54] STRUCTURAL JOINT

[76] Inventor: Christen K. Steenberg, 18 Finchley Rd., Islington, Ontario M9A 2X4, Canada

[21] Appl. No.: 187,028

[22] Filed: Sep. 15, 1980

[51] Int. Cl.³ .............. B25G 3/00; B23K 31/02; F16B 9/00; F06C 7/50
[52] U.S. Cl. .................. 182/194; 182/228; 29/521; 29/522 R; 29/514; 403/242; 403/282
[58] Field of Search ............ 182/228, 194; 403/242, 403/282, 274; 29/514, 520, 521, 432, 509

[56] References Cited

U.S. PATENT DOCUMENTS

| | | | |
|---|---|---|---|
| 991,779 | 5/1911 | Hoage | 403/242 |
| 2,201,193 | 5/1940 | McMahan | 29/432 |
| 3,022,857 | 2/1962 | Rich | 182/228 |
| 3,085,651 | 4/1963 | Rich | 182/228 |
| 3,085,652 | 4/1963 | Rich | 182/228 |
| 3,970,400 | 7/1976 | Reid | 182/228 |
| 4,080,713 | 3/1978 | Reid | 29/514 |
| 4,162,861 | 7/1979 | Reid | 182/228 |
| 4,204,587 | 5/1980 | Larson | 182/194 |

FOREIGN PATENT DOCUMENTS

| | | |
|---|---|---|
| 1009428 | 5/1977 | Canada . |
| 1081188 | 7/1980 | Canada . |
| 2509357 | 10/1975 | Fed. Rep. of Germany . |
| 2752618 | 5/1979 | Fed. Rep. of Germany . |
| 323781 | 5/1970 | Sweden . |
| 1452204 | 10/1976 | United Kingdom . |
| 1549071 | 7/1979 | United Kingdom . |

*Primary Examiner*—Reinaldo P. Machado

[57] ABSTRACT

A structural joint for joining two elements, the first element having an elongate major tongue of malleable deformable material and in one embodiment an elongate minor tongue, the second element having a curled tab. The major and minor tongues define an elongate recess adapted to receive the curled tab on joint formation. The two elements are pressed together to press the curled tab of the second element into the recess between the minor and major tongues of the first element and to cause the minor tongue and the second element to mutually penetrate and deform each other. The major tongue is then deformed about the curled tab to form at least a portion of an encircling curl which contacts the curled tab's external surface. When the elements are so joined, the gap between the major and minor tongues is less than the width of the curled tab, thereby precluding removal of the curled tab from the encircling curl. In another embodiment the curled tab is curled about a wire which acts as a filler or support, and the major tongue is deformed about the curled tab as before. The invention also comprises a ladder having rungs secured to side rails by structural joints in accordance with this invention.

11 Claims, 12 Drawing Figures

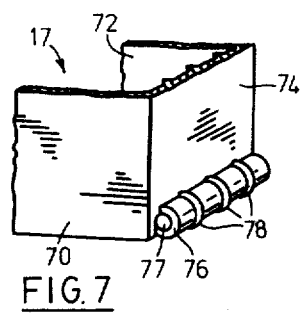
FIG.7
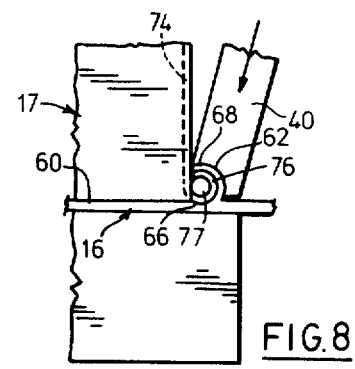
FIG.8
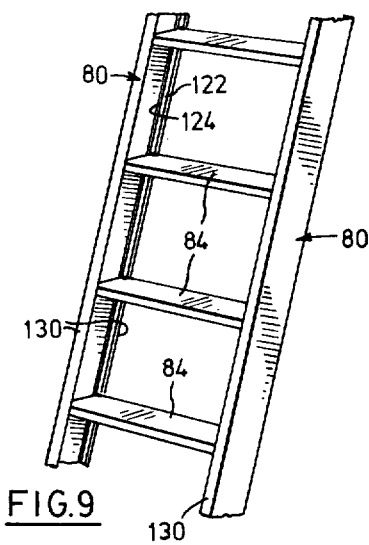
FIG.9
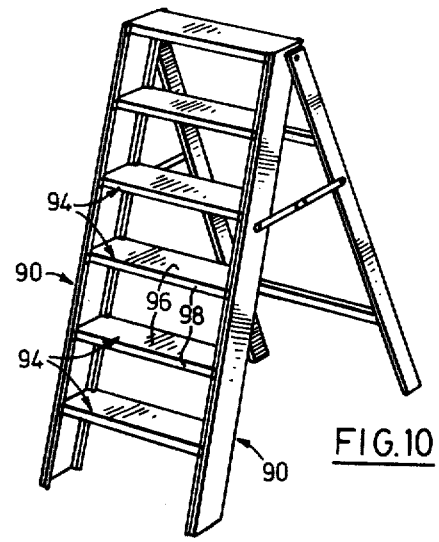
FIG.10
FIG.12
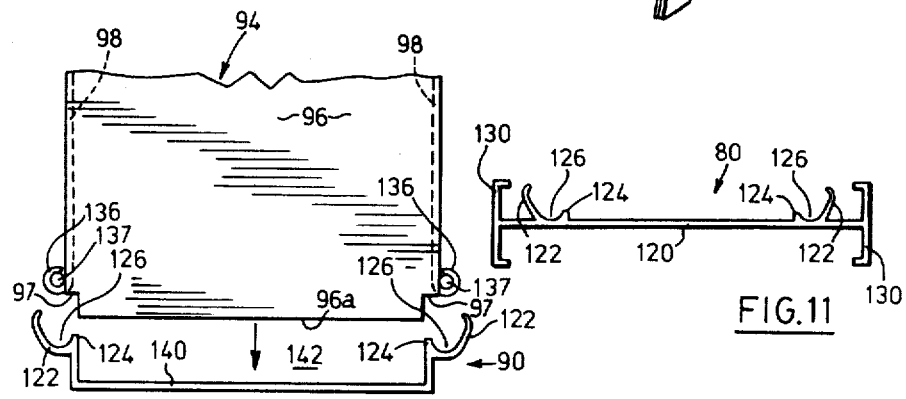
FIG.11

STRUCTURAL JOINT

This invention relates to structural joints for joining two elements.

Joints between elements which can be formed by pressing or by forming over operations are desirable because they eliminate the need for welding or rivetting and are economical to manufacture. U.S. Pat. No. 4,162,861 discloses a method of fastening together two elements by means of a pressing operation. A first element provided with a flange and a second element having a longitudinally extending recess adapted to receive the flange are pressed together. The flange is deformed in the recess into at least a portion of a coil of larger size than the entrance to the recess. Adjacent the flange of the first element is a tongue portion which at the same time provides an interference fit with the leg of the recess of the second element. On the other hand, U.S. Pat. No. 2,201,193 relates to a method of securing a malleable metal member to a wooden bar using what might be termed a formed over connection. The wooden bar is inserted between two arms of the metal member which are of sufficient length to project beyond the bar. These projections are then bent downwardly and inwardly towards the surface of the wooden bar, using a forming tool.

The present invention is concerned with structural joints formed by a pressing operation and/or a forming over operation and are more convenient. In addition they are secure, economical to manufacture, and, where desirable, a high degree of heat transfer between the parts connected is achieved.

According to the invention, a first and a second element are joined together to provide a completed joint, it being possible to join various types of elements together. According to a first aspect of the invention, the first element is provided with an elongate major or long tongue of malleable material and an elongate minor or short tongue. The second element has a curled tab. The major and minor tongues define an elongate recess adapted to receive the curled tab on joint formation. The minor tongue and the second element mutually penetrate and deform each other, and the curled tab is received in the recess between the minor and major tongues. The major tongue is deformed about the curled tab to form an overturned portion which contacts the external surface of the curled tab. This overturned portion and the edge of the minor tongue define a recess entrance smaller than the curled tab, thereby precluding removal of the curled tab from the recess.

According to a further aspect of the invention, a first element comprises on one surface a first pair of such a major and a minor tongue and a second pair of such a major and a minor tongue. The two pairs are spaced apart with the minor tongue opposing one another. A second element comprises on one side a pair of such spaced apart curled tabs. Each pair of major and minor tongues on the first element defines an elongate recess adapted to receive a respective curled tab on joint formation. The spacing between the curled tabs and the recesses is mutual so that the curled tabs are received in the recesses, and the minor tongues and the second element mutually penetrate and deform each other. Each major tongue is deformed about the respective curled tab to form an overturned portion which contacts the external surface of the curled tab. This overturned portion and the edge of the minor tongue define a recess entrance smaller than the respective curled tab, thereby precluding removal of each curled tab from its respective recess.

According to a further aspect of the invention, first element comprises a web portion having on one surface an elongate tongue of malleable material. A second element comprises a curled tab. The joint further comprises a filler element wherein the curled tab is curled about this filler element. The tongue and the adjacent portion of the web of the first element define an elongate concavity adapted to receive the curled tab on joint formation. The curled tab is received in the concavity and the tongue is deformed about the curled tab to form an overturned portion which contacts the external surface of the curled tab. This overturned portion and the adjacent portion of the web define an entrance to the concavity which is smaller than the curled tab, thereby precluding removal of the curled tab from the concavity.

According to a further aspect of the invention, a first element comprises a web portion having on one surface two elongate tongues of malleable material. A second element comprises on one side a pair of spaced apart curled tabs. The joint further comprises two filler elements wherein each curled tab is curled about one of the filler elements. Each tongue and adjacent portion of the web define a respective elongate concavity adapted to receive a respective curled tab on joint formation. The two tongues are spaced apart with the concavities opposing one another, and the spacing between the curled tabs and the concavities is mutual so that the curled tabs are received in these concavities. Each tongue is deformed about the respective curled tab to form an overturned portion which contacts the external surface of the respective curled tab. The overturned portions define a gap less than the width of the second element which includes both curled tabs, thereby precluding removal of the curled tabs from the concavities.

According to a further aspect of the invention, a method of forming a structural joint between two elements is provided. The first element comprises an elongate major tongue of malleable material and an elongate minor tongue. The second element comprises a curled tab. The major and minor tongues of the first element define an elongate recess adapted to receive a curled tab on joint formation. The method comprises the steps of:

applying sufficient force to said first and second elements so as to press the curled tab into the recess between the major and minor tongues and to cause the minor tongue and the second element to mutually penetrate and deform each other; and deforming the major tongue about the curled tab to form an overturned portion which contacts the external surface of the curled tab, the overturned portion and the edge of the minor tongue defining a recess entrance smaller than the curled tab.

According to a further aspect of the invention, a method of forming a structural joint between two elements is provided, in which the first element comprises a web portion having on one surface an elongate tongue of malleable material, and the second element comprises a curled tab. The joint further comprises a filler element, wherein the curled tab is curled about the filler element. The tongue and the adjacent portion of the web define an elongate concavity adapted to receive the curled tab on joint formation. This method comprises the steps of:

locating the curled tab in the concavity; and deforming the tongue about the curled tab to form an overturned portion which contacts the external surface of the curled tab. This overturned portion and the adjacent portion of the web define an entrance to the concavity smaller than the curled tab.

According to a further aspect of the invention, a method of forming a structural joint between two elements is provided, in which the first element comprises a web portion having on one surface two elongate tongues of malleable material, and the second element comprises on one side a pair of spaced apart curled tabs. The joint further comprises two filler elements wherein each curled tab is curled about one of the filler elements. Each tongue and adjacent portion of the web define a respective elongate concavity adapted to receive a respective curled tab on joint formation. The two tongues are spaced apart with the concavities opposing one another. The spacing between the curled tabs and the concavities is mutual so that the curled tabs can be received in the concavities. This method comprises the steps of:

locating the curled tabs in the respective concavities; and deforming each tongue about the respective curled tab to form an overturned portion which contacts the external surface of the respective curled tab. The overturned portions define a gap less than the width of the second element which includes both curled tabs.

Preferred embodiments of the present invention will now be described with reference to the accompanying drawings, in which:

FIG. 7 is a perspective view of a second element having a curled tab;

FIG. 8 is a sectional view showing a partially completed structural joint of the elements of FIGS. 6 and 7;

FIG. 9 is a view of a portion of an extension ladder having rungs secured to side rails by structural joints in accordance with this invention;

FIG. 10 is a view of a portion of a step-ladder having rungs or steps secured to side rails by structural joints in accordance with this invention;

FIG. 11 is a cross-sectional plan view of the side rail of the ladder of FIG. 9; and FIG. 12 is a cross-sectional plan view of the side rail and rung or step of the ladder of FIG. 10.

Figure 3:
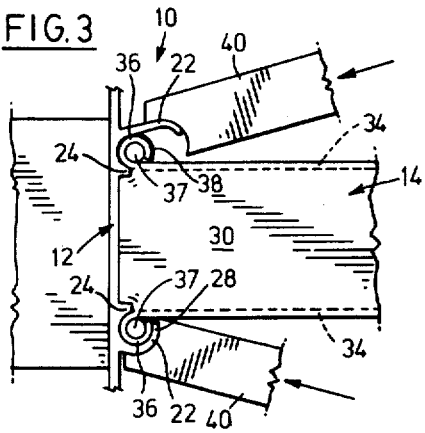
FIG. 3 is a sectional view showing a partially completed structural joint of the elements of FIGS. 1 and 2.

One embodiment of the structural joint, which is shown in section in near-completion in FIG. 3, and indicated generally at 10, comprises a first element 12 and a second element 14.

Figure 1:
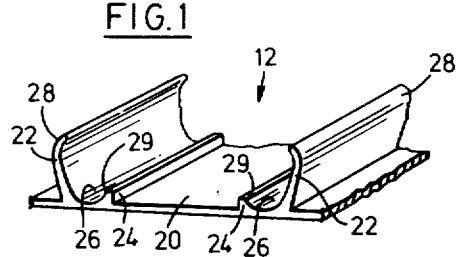
FIG. 1 is a perspective view of a first element having a pair of major and minor tongues.

As shown in FIG. 1, element 12 comprises a web portion 20 having on one surface two outer upstanding elongate major tongues 22 and two inner upstanding elongate minor tongues 24. Each pair of tongues 22 and 24 define a respective elongate recess 26 adapted to receive a respective curled tab of the second element on joint formation. Each major tongue 22 includes an uppermost portion 28 which is curved inwards towards a respective adjacent outer edge 29 of a minor tongue 24. Each major tongue 22 is located in a manner to allow application of a deforming tool. The major tongues 22 are made of malleable materials, and are deformed when the joint has been completed. The minor tongues 24 may deform to some extent depending on their shapes, thickness and materials incorporated, when the joint is completed. Preferably the first element 12 is formed as an aluminum alloy extrusion.

Figure 2:
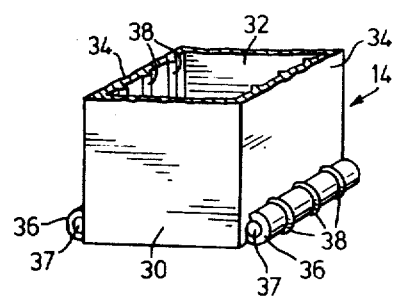
FIG. 2 is a perspective view of a second element having a pair of curled tabs.

FIG. 2 shows the second element 14. Preferably element 14 is a hollow box-section aluminum alloy extrusion, the lower end being trimmed by cutting out a short section of the front and back walls 30, 32 leaving projecting tabs formed by the projecting parts of the side walls 34. The tabs are subjected to a curling operation to provide the external curled tabs 36, each tab being curled about a wire 37 which acts as a filler or support. The tool used in this curling operation will be heated for fragile and/or brittle materials. In the element shown projecting transverse ribs 38 appear internally of the hollow structure and thus on the external periphery of the curled tabs 36. The spacing between the curled tabs 36 is mutual with respect to the elongate recesses 26 in order that the tabs are received within the recesses on joint formation. While a hollow box-section has been shown in FIG. 3 it will be appreciated that the second element may have a different shape and yet comprise two curled tabs having at least one wall extending between them. For example, the cross-section of the second element may be, U, T, H, or Z-shaped.

In order to make the joint, curled tabs 36 are brought into confronting relation with respective recesses 26 of element 12. Elements 12 and 14 are pressed together to cause a mutual penetration and deformation of minor tongues 24 and front and back walls 30, 32 adjacent respective walls 34. In FIG. 3, minor tongues 24 penetrate and deform walls 30, 32. However, in other instances walls 30, 32 may penetrate and deform tongues 24 or walls 30, 32 and tongues 24 may mutually penetrate and deform each other depending on the relative strengths, thicknesses, shapes and material of walls 30, 32 and tongues 24. Simultaneously curled tabs 36 are pressed into respective recesses 26. Major tongues 22 are then curled about respective curled tabs 36 using a curling tool 40 as is also shown in FIG. 3. Each minor tongue 24 with respective wall 34 adjacent respective curled tab 36 forms an anvil, to support respective curled tab 36 when major tongues 22 are curled around curled tabs 36. Simultaneously, transverse ribs 38 are pressed into major tongues 22, thereby further precluding respective slippage of elements 12 and 14. Simultaneously curled tabs 36 are forced into contact with respective lower walls of recesses 26. The curling tool 40 is heated for fragile and/or brittle materials. Major tongues 22 include respective overturned portions 28 which overlie respective portions of curled tabs 36 when the curling operation shown in FIG. 3 is completed. The overturned portion 28 and outer edges 29 of minor tongues 24 define respective recess entrances which are smaller than curled tabs 36, thereby precluding removal of curled tabs 36 from respective recesses 26. Preferably curling tool 40 has a wavy contour on its axis or curling. The waviness will be forced into the surfaces of major tongues 22 and transmitted into and through wires 37 into respective lower walls of recesses 26.

It will be appreciated that there is a mutual penetration and deformation of each minor tongue 24 and front and back walls 30, 32 close to the respective wall 34. This mutual penetration and deformation and the curling of major tongue 22 about curled tab 36 result in a deformation or cold working of the material of curled tab 36, respective lower wall of recess 26, respective tongues 22, 24 and walls 30, 32 and 34 adjacent minor tongue 24. Slippage of element 12 relative to element 14 is resisted both by the deformation of the curled tabs, the various tongues and walls, and by the tight engagement of major tongues 22 with the curled tabs 36. In addition, for those embodiments in which transverse ribs appear on the external periphery of the curled tabs 36, as in FIG. 2, slippage is also resisted by the tight engagement of major tongues 22 with the transverse ribs 38. Transverse ribs are not necessarily to provide tight engagement of the major tongues 22 and the curled tabs 36, but appear in embodiments in which it is necessary to provide maximum resistance to slippage. Rotational movements of element 12 relative to element 14 about one of the curled tabs is resisted by the engagement of the other curled tab with tongue 22 and lower wall of recess 26. It will be appreciated that the use of wires 37 as a filler or support provides solid metal in the area of the joint, and results in greater joint strength. Each wire 37 acts as an anvil for crushing the respective curled tab 36 and major tongue 22 when the major tongue is curled about the curled tab. Wires 37 also substantially assist in excluding moisture from the area of the joint, thereby tending to exclude joint weakening which would be caused by expansion of such moisture inside the joint.

It will be apparent that the arrangement of major tongues and minor tongues defining elongate recesses as shown in FIG. 1 provides a convenient element 12 comprising one component of the joint. However, it will be understood that the relative size of the tongues may be widely varied, for example, a minor tongue may have a greater upstanding extent than a major tongue.

It will be appreciated that the curled tab in this embodiment is a convenient rib about which a major tongue can be deformed. However use of a curled tab is not central to this aspect of the invention, and references to a curled tab will be understood as including any rib or other protuberance about which the respective major tongue can be deformed as described above.

Figure 6:
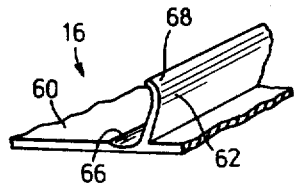
FIG. 6 is a perspective view of a first element having a major tongue.

Another embodiment of the structural joint, which is shown in section in near-completion in FIG. 8, and indicated generally as 15, comprises a first element 16 and a second element 17. As shown in FIG. 6, element 16 comprises a web portion 60 having on one surface an upstanding elongate major tongue 62. Tongue 62 and the adjacent portion of web 60 define an elongate concavity 66 adapted to receive a curled tab of the second element on joint formation. Major tongue 62 includes an uppermost portion 68 which curves inward in the direction of concavity 66. Major tongue 62 is made of malleable materials, is located in a manner to allow application of a deforming tool, and is deformed when the joint has been completed. Preferably the first element 16 is formed as an aluminum alloy extrusion.

FIG. 7 shows a second element 17 in which the cross-section is of hollow U-shape. Preferably element 17 is an aluminum alloy extrusion, the lower end being trimmed by cutting out a short section of opposing walls 70, 72 leaving a projecting tab formed by the projecting part of the third wall 74. The tab is then subjected to a curling operation to provide the external curled tab 76, the tab being curled about a wire 77 which acts as a filler or support. The tool used in this curling operation will be heated for fragile and/or brittle materials. In the element shown projecting transverse ribs 78 appear internally of the hollow structure and thus on the external periphery of the curled tab 76. While a hollow U-shape section has been shown in FIG. 7, it will be appreciated that this is not central to the invention and the second element may have a different shape.

In order to make the joint, the curled tab 76 is brought into confronting relation with concavity 66 of element 16. Elements 16 and 17 are pressed together to press curled tab 76 into concavity 66. Major tongue 62 is then curled about the curled tab 76 using a curling tool 40 as shown in FIG. 8. Simultaneously, transverse ribs 78 are pressed into the major tongue 62, thereby assisting in resisting respective slippage of elements 16 and 17. Transverse ribs are not necessary to prevent such slippage, but appear on the contacting surface of tongue 62 or curled tab 76 when it is necessary to provide maximum resistance to slippage. Simultaneously, the curled tab 76 is forced into contact with the lower wall of concavity 66. The curling tool 40 is heated for fragile and/or brittle materials. The major tongue 62 includes an overturned portion 68 which overlies a portion of the curled tab 76 when the curling operation shown in FIG. 8 is completed. This overturned portion and the adjacent portion of web 60 define an entrance to concavity 66 which is smaller than curled tab 76, thereby precluding removal of curled tab 76 from concavity 66. Preferably curling tool 40 has a wavy contour on its axis of curling. The waviness will be forced into the surface of major tongue 62 and transmitted into and through wire 77 into the lower wall of concavity 66.

The curling of major tongue 62 about curled tab 76 results in a deformation or cold working of the material of major tongue 62, curled tab 76, and the lower wall of concavity 66. Slippage of element 16 relative to element 17, and rotational movements about the curled tab, are resisted both by the deformation of the major tongue, curled tab, wire and wall of the concavity, and by the tight engagement of major tongue 62 with the transverse ribs 78 on the external periphery of curled tab 76. The use of wire 77 as a filler or support provides solid metal in the area of the joint for better joint strength, and excludes moisture for the joint area.

Figure 5:
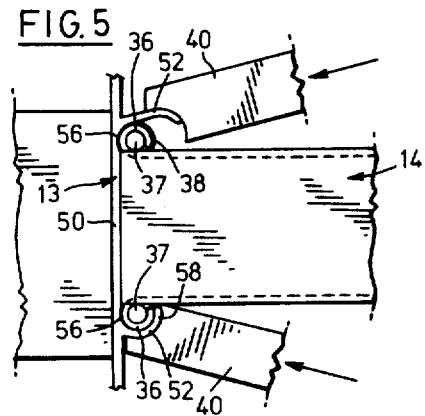
FIG. 5 is a sectional view showing a partially completed structural joint of the elements of FIGS. 2 and 4.

An alternate embodiment of the structural joint, which is shown in section in near-completion in FIG. 5 and indicated generally at 11, comprises a first element 13, and the second element 14 used in the first embodiment.

Figure 4:
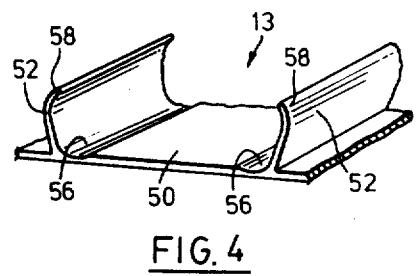
FIG. 4 is a perspective view of a first element having a pair of major tongues.

As shown in FIG. 4 element 13 is similar to that of the embodiment of FIG. 1, except that it lacks the two inner upstanding elongate minor tongues 24 of FIG. 1. Element 13 comprises a web portion 50 having on one surface two outer upstanding elongate major tongues 52. Each tongue 52 and adjacent portion of web 50 define a respective elongate concavity 56 adapted to receive a respective curled tab of the second element on joint formation. Each major tongue 52 includes an uppermost portion 58 which curves inward toward the uppermost portion 58 of the other major tongue 52. Each major tongue 52 is located in a manner to allow application of a deforming tool. The major tongues 52 are made of malleable materials, and are deformed when the joint has been completed. Preferably the first element 13 is formed as an aluminum alloy extrusion.

In order to make the joint, curled tabs 36 are brought into confronting relation with respective concavities 56 of element 13. Elements 13 and 14 are pressed together to press curled tabs 36 into respective concavities 56. Major tongues 52 are then curled about respective curled tabs 36 using a curling tool 40 as is shown in FIG. 5. Simultaneously, transverse ribs 38 are pressed into major tongues 52, thereby assisting in resisting respective slippage of elements 13 and 14. Transverse ribs are not necessary to prevent such slippage, but appear on the contacting surface of tongues 52 or curled tabs 36 when maximum resistance to slippage is desired. Simultaneously, curled tabs 36 are forced into contact with respective lower walls on concavities 56. The curling tool 40 is heated for fragile and/or brittle materials. Major tongues 52 include respective overturned portions 58 which overlie respective portions of curled tabs 36 when the curling operation shown in FIG. 5 is completed. The overturned portions 58 define a gap less than the width of the second element which includes both curled tabs 36, thereby precluding removal of curled tabs 36 from respective concavities 56. Preferably curling tool 40 has a wavy contour on its axis of curling. The waviness will be forced into the surfaces of major tongues 52 and transmitted into and through wires 37 into respective lower walls on concavities 56.

The curling of major tongue 52 about curled tab 36 results in a deformation or cold working of the material of major tongue 52, curled tab 36 and respective lower wall of concavity 56. Slippage of element 13 relative to element 14 is resisted both by the deformation of the major tongues, curled tabs, wires, and walls of the concavities, and by the tight engagement of major tongues 52 with the transverse ribs 38 on the external periphery of the curled tabs 36. Rotational movements of element 13 relative to element 14 about one of the curled tabs is resisted by the engagement of the other curled tab with tongue 52 and lower wall of concavity 56. The use of wires 37 as a filler or support again provides solid metal in the area of the joint for better joint strength, and excludes moisture from the joint area.

In a possible modification to the methods of making the above embodiments, the curled tabs are only partly curled about wires 37 and the major tongues are curled about the partly curled tabs. Each curled tab is formed by the operation of curling the respective major tongue to form a portion of an encircling curl.

As shown in FIGS. 9, 10, 11 and 12, the invention also comprises ladders including a pair of side rails and interconnecting rungs or steps, in which a side rail and a rung or step are connected by means of any of the structural joints herein described. Such ladders may be of the type referred to as extension ladders as shown in FIG. 9 or of the type referred to as step ladders as shown in FIG. 10.

In each of these embodiments the side rail of the ladder may correspond generally to element 12 illustrated in FIG. 1.

Thus, in FIG. 11 the side rail 80 comprises a web portion 120. Projecting from one side of web 120 are two major tongues 122 and two minor tongues 124. The tongues 122 and 124 define respective elongate recesses 126 adapted to receive curled tabs formed on the rung 84.

In this embodiment the rung 84 is of hollow box section with substantially flat opposed side surfaces. A cross-section through a rung would have the shape of a parallelogram in order that the upper surface of the rung would be approximately horizontal when the ladder is in use leaning toward a wall or other support. Each end of the rung 84 comprises a pair of spaced apart curled tabs similar to the portion shown in FIG. 2. The spacing of the curled tabs and the elongate recesses 126 is mutual so that the curled tabs are received in the recesses, and the minor tongues and the end of the rung mutually penetrate and deform each other. Each major tongue is deformed about a respective curled tab to form at least a portion of an encircling curl which contacts the external surface of the respective curled tab. Each major tongue comprises an overturned portion which overlies a portion of the respective curled tab. This overturned portion and the edge of a respective minor tongue define a recess entrance smaller than the respective curled tab, thereby precluding removal of the curled tab from the recess.

In order to provide better stiffness, the side rail comprises a broad U-shaped flange 130 at either end of web 120. Suitable stiffness may be obtained by using any of a number of flange configurations. However, ideally the cross-section of both side rail and rung is such that these parts may be conveniently extruded in aluminum or the like.

FIG. 10 illustrates a step ladder of conventional configuration with rungs or steps 94 attached to side rails 90 according to this invention.

FIG. 12 illustrates the side rail 90 and step 94 in a cross-section plan view prior to joint formation. The side rail 90 comprises a web 140 and two major tongues 122 and two minor tongues 124 to one side of web 140. The tongues 122 and 124 define respective elongate recesses 126 adapted to receive curled tabs formed on step 94 on joint formation. In the case of the step ladder it will be observed that web 140 is lowered such that recess 126 is located away from the web 140. This provides better stiffness to the step ladder and will be explained in greater detail subsequently.

The step 94 comprises a broad tread portion 96 and two downwardly projecting edge flanges 98. Each end of step 94 comprises a pair of spaced apart curled tabs 136. Each curled tab 136 is an extension of one of the edge flanges 98, and is curled about a filler element 137. The spacing of the curled tabs 136 and the elongate recesses 126 is mutual so that the curled tabs are received in the recesses and the minor tongues and the tread portion 96 mutually penetrate and deform each other. Each major tongue is deformed about a respective curled tab to form at least a portion of an encircling curl which contacts the external surface of the curled tab. The major tongue comprises an overturned portion which overlies a portion of the curled tab. This overturned portion and the edge of the respective minor tongue define a recess entrance smaller than the curled tab, there by precluding removal of the curled tab from the recess.

From observing FIG. 12 it will be noted that minor tongues 124 and web portion 140 together constitute a U-shaped opening or channel 142. The tread portion 96 of the step is formed prior to joint formation as shown in FIG. 12 so as to have a portion 96A which projects outwardly beyond the curled tabs 136. Portion 96A is snuggly received within the U-shaped opening or channel 142 on joint formation. The mutual penetration of the minor tongues 124 with tread portion 96 commences as the edge 97 contacts the minor tongue 124.

Various changes may be made to the configurations of the side rails or the steps to provide suitable stiffness to carry the loads involved. Ideally however the cross-section of the side rails and rungs or steps is such that these parts may be readily extruded in aluminum or the like.

What I claim as my invention is:

1. A structural joint formed upon joining two elements, the first element comprising an elongate major tongue of malleable material and an elongate minor tongue, the second element comprising a curled tab, the major and minor tongues defining an elongate recess adapted to receive the curled tab on joint formation, the minor tongue and the second element mutually penetrating and deforming each other, and the curled tab received in the recess between the minor and major tongues, the major tongue deformed about the curled tab to form an overturned portion which contacts the external surface of the curled tab, said overturned portion and the edge of the minor tongue defining a recess entrance smaller than the curled tab.

2. A structural joint as claimed in claim 1 in which said first element comprises on one surface a first pair of such a major and a minor tongue and a second pair of such a major and a minor tongue, the two pairs spaced apart with said minor tongues opposing one another, said second element comprising on one side a pair of such spaced apart curled tabs, each pair of major and minor tongues defining an elongate recess adapted to receive a respective curled tab on joint formation, and the spacing between said curled tabs and said recess is mutual so that said curled tabs are received in said recesses, and said minor tongues and said second element mutually penetrate and deform each other.

3. A structural joint as claimed in claim 1, in which said second element is of hollow box section with substantially flat opposed side walls, and said curled tab is an extension of one of said side walls.

4. A structural joint as claimed in claim 1, in which said second element comprises at least two walls, said curled tab is an extension of one of said walls, and said minor tongue and an other of said walls mutually penetrate and deform each other.

5. A structural joint as claimed in claim 1, 2 or 4 and further comprising a filler element and wherein said curled tab is curled about said filler element.

6. A structural joint as claimed in claim 1, 2 or 4, in which said external surface of said curled tab comprises transverse ribs contacting said portion of an encircling curl.

7. A ladder comprising two side rails and a plurality of rungs, in which said rungs are affixed to said side rails by a structural joint, in which each side rail comprises a first pair of an elongate major tongue of malleable material and an elongate minor tongue and a second pair of an elongate major tongue of malleable material and an elongate minor tongue, the two pairs spaced apart with said minor tongues opposing one another, in which at least one rung is of hollow box section with substantially flat opposed side walls, comprising at each end a pair of spaced apart curled tabs, wherein each curled tab is an extension of one of said side walls, each pair of major and minor tongues defining an elongate recess adapted to receive a respective curled tab on joint formation, wherein the spacing between said curled tabs and said recesses is mutual so that said curled tabs are received in said recesses and said minor tongues and said end of said rung mutually penetrate and deform each other, each major tongue deformed about a respective curled tab to form at least an overturned portion which contacts the external surface of said respective curled tab, said overturned portion and the edge of a respective minor tongue defining a recess entrance smaller than said respective curled tab.

8. A ladder comprising two side rails and a plurality of step members, in which at least one of said step members is fixed to at least one of said side rails by a structural joint, said one of said side rails comprising a first pair of an elongate major tongue of a malleable material and an elongate minor tongue and a second pair of an elongate major tongue of malleable material and an elongate minor tongue, the two pairs spaced apart said minor tongues opposing one another, in which said step member comprises a tread portion having downwardly projecting edge flanges along opposite edges thereof, said flanges comprising at each end a pair of spaced apart curled tabs, wherein each curled tab is an extension of one of said flanges, each pair of major and minor tongues defining an elongate recess adapted to receive a respective curled tab on joint formation, wherein the spacing between said curled tabs and said recesses is mutual so that said curled tabs are received in said recesses, and said minor tongues and said tread portion mutually penetrate and deform each other, each major tongue deformed about a respective curled tab to form an overturned portion which contacts the external surface of said respective curled tab, said overturned portion and the edge of a respective minor tongue defining a recess entrance smaller than said respective curled tab.

9. A structural joint formed upon joining two elements, the first element comprising a web portion having on one surface an elongate tongue of malleable material, the second element comprising a curled tab, the joint further comprising a filler element, wherein said curled tab is curled about said filler element, the tongue and the adjacent portion of the web defining an elongate concavity adapted to receive the curled tab on joint formation, the curled tab received in said concavity and the tongue deformed about the curled tab to form an overturned portion which contacts the external surface of the curled tab, said overturned portion and the adjacent portion of the web defining an entrance to the concavity smaller than the curled tab.

10. A structural joint formed upon joining two elements, the first element comprising a web portion having on one surface two elongate tongues of malleable material, the second element comprising on one side a pair of spaced apart curled tabs, the joint further comprising two filler elements wherein each curled tab is curled about one of said filler elements, each tongue and adjacent portion of the web defining a respective elongate concavity adapted to receive a respective curled tab on joint formation, the two tongues spaced apart with the concavities opposing one another, wherein the spacing between said curled tabs and said concavities is mutual so that said curled tabs are received in said concavities, each tongue deformed about the respective curled tab to form an overturned portion which contacts the external surface of the respective curled tab, the overturned portions defining a gap less than the width of the second element which includes both curled tabs.

11. A structural joint as claimed in claim 10 or 11, in which said external surface of at least one of said curled tabs comprises transverse ribs contacting the portion of a respective encircling curl.

* * * * *